US011574030B1

(12) United States Patent
Harrigan et al.

(10) Patent No.: US 11,574,030 B1
(45) Date of Patent: Feb. 7, 2023

(54) SOLVING OPTIMIZATION PROBLEMS USING A HYBRID COMPUTER SYSTEM

(71) Applicant: Rigetti & Co, LLC, Berkeley, CA (US)

(72) Inventors: Matthew P. Harrigan, Emeryville, CA (US); Erik Joseph Davis, Berkeley, CA (US)

(73) Assignee: Rigetti & Co, LLC, Berkeley, CA (US)

(*) Notice: Subject to any disclaimer, the term of this patent is extended or adjusted under 35 U.S.C. 154(b) by 344 days.

(21) Appl. No.: 16/663,848

(22) Filed: Oct. 25, 2019

Related U.S. Application Data

(60) Provisional application No. 62/752,195, filed on Oct. 29, 2018.

(51) Int. Cl.
| | |
|---|---|
| *G06F 17/11* | (2006.01) |
| *G06F 17/17* | (2006.01) |
| *G06N 10/00* | (2022.01) |
| *G06F 17/16* | (2006.01) |

(52) U.S. Cl.
CPC .............. *G06F 17/11* (2013.01); *G06F 17/16* (2013.01); *G06F 17/175* (2013.01); *G06N 10/00* (2019.01)

(58) Field of Classification Search
CPC .......... G06F 17/10; G06F 17/11; G06F 17/15; G06F 17/16; G06F 17/175; G06N 10/00; G06N 5/003; G06Q 10/04
See application file for complete search history.

(56) References Cited

U.S. PATENT DOCUMENTS

| | | | |
|---|---|---|---|
| 6,704,692 B1 * | 3/2004 | Banerjee | G01S 13/726 |
| | | | 342/96 |
| 2017/0255592 A1 * | 9/2017 | Karimi | G06N 5/025 |

(Continued)

OTHER PUBLICATIONS

R. Shaydulin, H. Ushijima-Mwesigwa, C. F. A. Negre, I. Safro, S. M. Mniszewski and Y. Alexeev, "A Hybrid Approach for Solving Optimization Problems on Small Quantum Computers," in Computer, vol. 52, No. 6, pp. 18-26, Jun. 2019, doi: 10.1109/MC.2019.2908942. (Year: 2019).*
Nielsen, Michael. "Quantum Computation and Quantum Information—Cas." Http://Mmrc.amss.cas.cn/, 2010, http://mmrc.amss.cas.cn/tlb/201702/W020170224608149940643.pdf. (Year: 2010).*

(Continued)

*Primary Examiner* — Matthew D Sandifer
*Assistant Examiner* — Huy Duong
(74) *Attorney, Agent, or Firm* — Henry Patent Law Firm PLLC (57) ABSTRACT

In a general aspect, an optimization problem is solved using a hybrid computing system. A classical processor unit receives a first data structure that represents the optimization problem. The classical processor unit executes a branch-and-bound process on the first data structure to generate values for a first subset of elements of a solution to the optimization problem. A second data structure is generated based on the first data structure and the first subset of elements. The second data structure represents a reduced version of the optimization problem. A quantum processor unit and a classical processor unit are used to execute a quantum approximate optimization algorithm (QAOA) on the second data structure to generate values for a second subset of the elements of the solution to the optimization problem. The first subset and second subset are combined to obtain the solution to the optimization problem.

12 Claims, 5 Drawing Sheets

(56) References Cited

U.S. PATENT DOCUMENTS

2020/0234172 A1\* 7/2020 King ............... G06K 9/6223
2021/0166148 A1\* 6/2021 Matsuura ............. G06F 17/18

OTHER PUBLICATIONS

D-Wave Systems Inc., "D-Wave Problem-Solving Handbook", D-Wave User Manual 09-1171A-A, Oct. 1, 2018, 114 pgs.
Booth, et al., "Partitioning Optimization Problems for Hybrid Classical/Quantum Execution", D-Wave Technical Report Series, 14-1006A-A, Oct. 18, 2017, 14 pgs.
Farhi, et al., "A Quantum Approximate Optimization Algorithm", arXiv:1411.4028v1, Nov. 14, 2014, 16 pgs.
Farhi, E., et al., "A Quantum Approximate Optimization Algorithm Applied to a Bounded Occurrence Constraint Problem", arXiv:1412.6062v2 [quant-ph], Jun. 25, 2015, 13 pages.
Farhi, E., et al., "Quantum Supremacy through the Quantum Approximate Optimization Algorithm", arXiv:1602.07674v1 [quant-ph], Feb. 24, 2016, 22 pages.
Guerreschi, et al., ""Practical Optimization for Hybrid Quantum-Classical Algorithms"", arXiv:1701.01450v1 [quant-ph], Jan. 5, 2017, 25 pgs.
Lucas, "Ising formulations of many NP problems", arXiv:1302.5843v3, Jan. 24, 2014, 27 pgs.
Otterbach, "Unsupervised Machine Learning on a Hybrid Quantum Computer", arXiv:1712.05771v1, Dec. 15, 2017, 17 pgs.
Pardalos, et al., "Computational Aspects of a Branch and Bound Algorithm for Quadratic Zero-One Programming", Computing, Springer, Apr. 1990, 14 pgs.
Rosenberg, et al., "Building an iterative heuristic solver for a quantum annealer", arXiv:1507.07605v2, Aug. 28, 2015, 21 pgs.
Zeng, "Quantum Approximate Optimization on a Gate-model Superconducting Processor", APS March Meeting, Mar. 15, 2017, 37 pgs.

\* cited by examiner

SOLVING OPTIMIZATION PROBLEMS USING A HYBRID COMPUTER SYSTEM

CROSS-REFERENCE TO RELATED APPLICATIONS

This application claims priority to U.S. Provisional Application No. 62/752,195 filed Oct. 29, 2018 and entitled "Solving Optimization Problems Using a Hybrid Computer System". The contents of the above-referenced priority application are hereby incorporated by reference.

BACKGROUND

The following description relates to solving optimization problems using a hybrid computer system.

Quantum computers can perform computational tasks by executing quantum algorithms. A quantum algorithm can be represented, for example, as a quantum Hamiltonian, a sequence of quantum logic operations, a set of quantum machine instructions, or otherwise. A variety of physical systems have been proposed as quantum computing systems. Examples include superconducting circuits, trapped ions, spin systems and others.

DETAILED DESCRIPTION

Many discrete optimization problems in industry and science take the form of Combinatorial Optimization problems (COPs). Examples range from scheduling, network traffic routing and portfolio optimization to statistics, physics and chemistry. COPs come in the form of finding a feasible set $S \subset 2^{|E|}$ of (approximately) optimal solutions from the set of all sets, where $|E|$ is the size of the problem measured in bits, and the space of possible solutions scales exponentially with $|E|$. The challenge is to develop heuristics and algorithms that produce the set S (or even just a member of this set) without having to list and check all $2^{|E|}$ combinations.

Many NP-complete problems, e.g., all of Karp's 21 problems (as well as others), can be cast as finding the ground-state of a classical Ising model corresponding to an arbitrary graph and hence fall into the class of discrete optimization problems. By sampling classic bit-strings we will eventually find an optimal one that minimizes the energy of the Ising model.

The quantum approximate optimization algorithm (QAOA) can be viewed through the lens of probabilistic optimization algorithms. QAOA can be interpreted as a parameterized quantum logic gate prescription, whose execution prepares a distribution of bit-strings that can be sampled. A COP can be encoded in the QAOA, and optimizing the parameters in the QAOA leads to distributions that allow efficient sampling of (approximately) optimal solutions to the encoded COP. For example, the number of samples needed to find a feasible solution is substantially smaller than the number required via random sampling of the full exponential state space.

Quantum computers are hypothesized to solve COPs more quickly, but the size of COPs (as measured by number of bits or size in bits, for example) solvable by classical computers currently exceeds available quantum resources. However, COPs like staff scheduling, vehicle routing, and bin packing—while ubiquitous—are difficult to solve using classical computing architectures. Techniques and systems described here can be used to combine classical computing resources with quantum computing resources to solve a variety of optimization problems.

In some implementations, the techniques and systems described here provide technical advantages and improvements over existing approaches, for example, for data processing applications. For example, an exact solution to a COP may be obtained using a combination of classical and quantum computing resources. In some cases, the use of classical and quantum resources can be balanced to improve the speed or efficiency of solving the optimization problem. For instance, a classical computing resource may be used to reduce an optimization problem to a smaller size, and the reduced optimization problem may be solved using a quantum computing resource.

Many commercially-useful cases for COPs involve problems of size greater than will fit on near-term quantum resources. For example, COPs of 1,000 bits would generally be too large for 100-qubit quantum processors. The techniques and systems presented here can be used to improve the competitive advantage of near-term quantum computers in solving COPs. These techniques and systems may effectively "distill" a large optimization problem into a kernel that contains a computationally-difficult portion. In some cases, the kernel can conceivably fit on a near-term quantum computer. As a result, quantum computers could achieve a competitive advantage by processing such kernels, which are computationally inefficient to process on classical solvers. The techniques and systems described here may allow for the automated selection of relevant, but atypically-difficult problems, and may be applicable to problems other than COPs.

Figure 1:
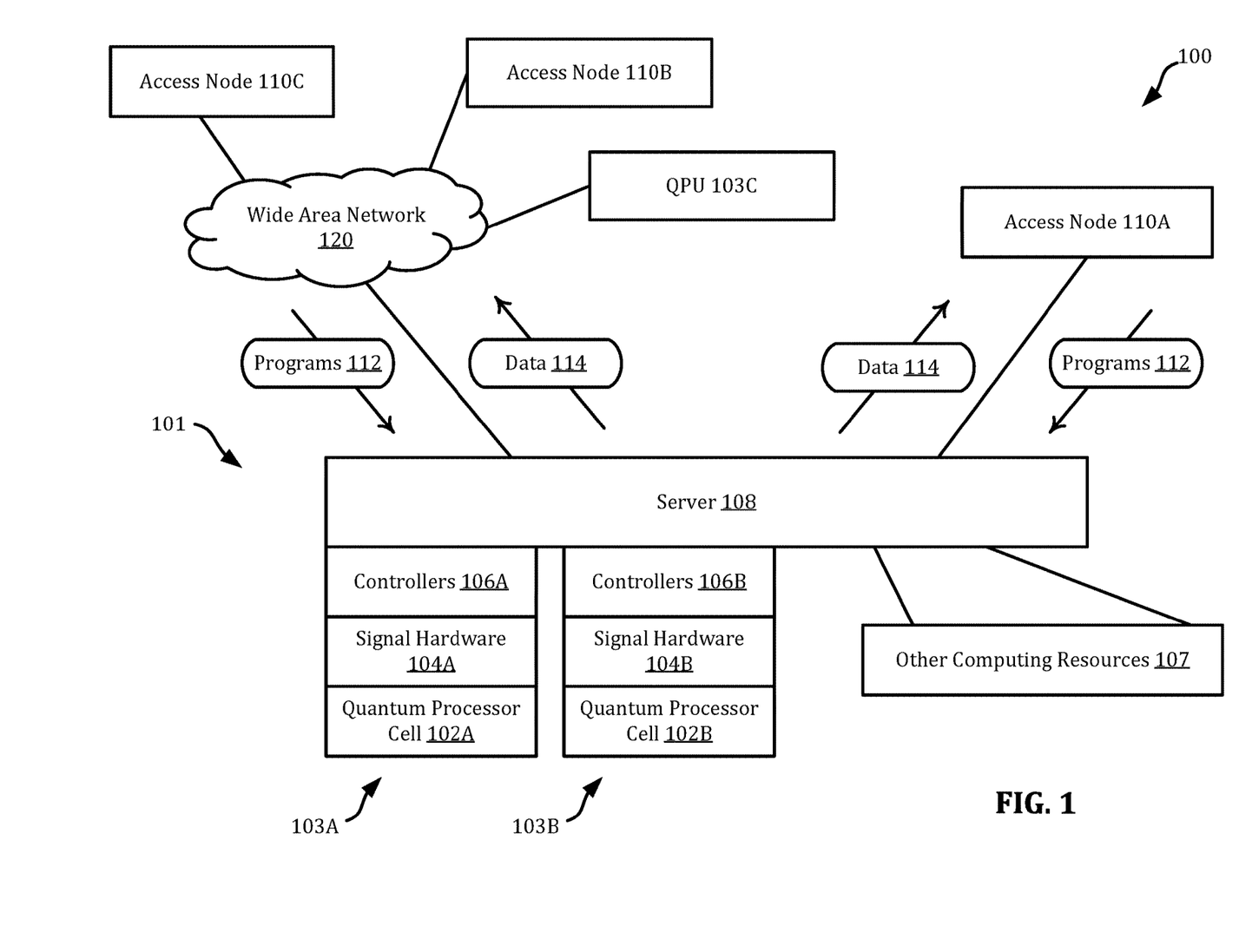
FIG. 1 is a block diagram of an example hybrid computing system.

FIG. 1 is a block diagram of an example computing system 100. The example computing system 100 shown in FIG. 1 includes a computing environment 101 and access nodes 110A, 110B, 110C. A computing system may include additional or different features, and the components of a computing system may operate as described with respect to FIG. 1 or in another manner.

The example computing environment 101 includes computing resources and exposes their functionality to the access nodes 110A, 110B, 110C (referred to collectively as "access nodes 110"). The computing environment 101 shown in FIG. 1 includes a server 108, quantum processor units 103A, 103B and other computing resources 107. The computing environment 101 may also include one or more of the access nodes (e.g., the example access node 110A) and other features and components. A computing environment may include additional or different features, and the components of a computing environment may operate as described with respect to FIG. 1 or in another manner.

The example computing environment 101 can provide services to the access nodes 110, for example, as a cloud-based or remote-accessed computer, as a distributed computing resource, as a supercomputer or another type of high-performance computing resource, or in another manner. The computing environment 101 or the access nodes 110 may also have access to one or more remote quantum processor units or QPUs (e.g., QPU 103C). As shown in FIG. 1, to access computing resources of the computing environment 101, the access nodes 110 send programs 112 to the server 108 and in response, the access nodes 110 receive data 114 from the server 108. The access nodes 110 may access services of the computing environment 101 in another manner, and the server 108 or other components of the computing environment 101 may expose computing resources in another manner.

Any of the access nodes 110 can operate local to, or remote from, the server 108 or other components of the computing environment 101. In the example shown in FIG. 1, the access node 110A has a local data connection to the server 108 and communicates directly with the server 108 through the local data connection. The local data connection can be implemented, for instance, as a wireless Local Area Network, an Ethernet connection, or another type of wired or wireless connection. Or in some cases, a local access node can be integrated with the server 108 or other components of the computing environment 101. Generally, the computing system 100 can include any number of local access nodes.

In the example shown in FIG. 1, the access nodes 110B, 110C and the QPU 103C each have a remote data connection to the server 108, and each communicates with the server 108 through the remote data connection. The remote data connection in FIG. 1 is provided by a wide area network 120, such as, for example, the Internet or another type of wide area communication network. In some cases, remote access nodes use another type of remote data connection (e.g., satellite-based connections, a cellular network, a private network, etc.) to access the server 108. Generally, the computing system 100 can include any number of remote access nodes.

The example server 108 shown in FIG. 1 communicates with the access nodes 110 and the computing resources in the computing environment 101. For example, the server 108 can delegate computational tasks to the quantum processor units 103A, 103B and the other computing resources 107, and the server 108 can receive the output data from the computational tasks performed by the quantum processor units 103A, 103B and the other computing resources 107. In some implementations, the server 108 includes a personal computing device, a computer cluster, one or more servers, databases, networks, or other types of classical or quantum computing equipment. The server 108 may include additional or different features, and may operate as described with respect to FIG. 1 or in another manner.

Each of the example quantum processor units 103A, 103B operates as a quantum computing resource in the computing environment 101. The other computing resources 107 may include additional quantum computing resources (e.g., quantum processor units, quantum virtual machines (QVMs) or quantum simulators) as well as classical (non-quantum) computing resources such as, for example, digital microprocessors, specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), etc., or combinations of these and other types of computing modules.

In some implementations, the server 108 generates computing jobs, identifies an appropriate computing resource (e.g., a QPU or QVM) in the computing environment 101 to execute the computing job, and sends the computing job to the identified resource for execution. For example, the server 108 may send a computing job to the quantum processor unit 103A, the quantum processor unit 103B or any of the other computing resources 107. A computing job can be formatted, for example, as a computer program, function, code or other type of computer instruction set. Each computing job includes instructions that, when executed by an appropriate computing resource, perform a computational task and generate output data based on input data. For example, a computing job can include instructions formatted for a quantum processor unit, a quantum virtual machine, a digital microprocessor, co-processor or other classical data processing apparatus, or another type of computing resource.

In some implementations, the server 108 operates as a host system for the computing environment 101. For example, the access nodes 110 may send programs 112 to server 108 for execution in the computing environment 101. The server 108 can store the programs 112 in a program queue, generate one or more computing jobs for executing the programs 112, generate a schedule for the computing jobs, allocate computing resources in the computing environment 101 according to the schedule, and delegate the computing jobs to the allocated computing resources. The server 108 can receive, from each computing resource, output data from the execution of each computing job. Based on the output data, the server 108 may generate additional computing jobs, generate data 114 that is provided back to an access node 110, or perform another type of action.

In some implementations, all or part of the computing environment 101 operates as a cloud-based quantum computing (QC) environment, and the server 108 operates as a host system for the cloud-based QC environment. For example, the programs 112 can be formatted as quantum computing programs for execution by one or more quantum processor units. The server 108 can allocate quantum computing resources (e.g., one or more QPUs, one or more quantum virtual machines, etc.) in the cloud-based QC environment according to the schedule, and delegate quantum computing jobs to the allocated quantum computing resources for execution.

In some implementations, all or part of the computing environment 101 operates as a hybrid computing environment, and the server 108 operates as a host system for the hybrid environment. For example, the programs 112 can be formatted as hybrid computing programs, which include instructions for execution by one or more quantum processor units and instructions that can be executed by another type of computing resource. The server 108 can allocate quantum computing resources (e.g., one or more QPUs, one or more quantum virtual machines, etc.) and other computing resources (e.g., one or more classical processors) in the hybrid computing environment according to the schedule, and delegate computing jobs to the allocated computing resources for execution. The other (non-quantum) computing resources in the hybrid environment may include, for example, one or more digital microprocessors, one or more specialized co-processor units (e.g., graphics processing units (GPUs), cryptographic co-processors, etc.), special purpose logic circuitry (e.g., field programmable gate arrays (FPGAs), application-specific integrated circuits (ASICs), etc.), systems-on-chips (SoCs), or other types of computing modules.

In some cases, the server 108 can select the type of computing resource (e.g., quantum or otherwise) to execute an individual computing job in the computing environment 101. For example, the server 108 may select a particular quantum processor unit (QPU) or other computing resource based on availability of the resource, speed of the resource, information or state capacity of the resource, a performance metric (e.g., process fidelity) of the resource, or based on a combination of these and other factors. In some cases, the server 108 can perform load balancing, resource testing and calibration, and other types of operations to improve or optimize computing performance.

The example server 108 shown in FIG. 1 may include a quantum machine instruction library or other resources that the server 108 uses to produce quantum computing jobs to be executed by quantum computing resources in the computing environment 101 (e.g., by the quantum processor unit 103). The quantum machine instruction library may include, for example, calibration procedures, hardware tests, quantum algorithms, quantum gates, etc. The quantum machine instruction library can include a file structure, naming convention, or other system that allows the resources in the quantum machine instruction library to be invoked by the programs 112. For instance, the server 108 or the computing environment 101 can expose the quantum machine instruction library to the access nodes 110 through a set of application programming interfaces (APIs). Accordingly, the programs 112 that are produced by the access nodes 110 and delivered to the server 108 may include information that invokes a quantum machine instruction library stored at the server 108. In some implementations, one or more of the access nodes 110 includes a local version of a quantum machine instruction library. Accordingly, the programs 112 that are produced by the access node 110B and delivered to the server 108 may include instruction sets from a quantum machine instruction library.

Each of the example quantum processor units 103A, 103B shown in FIG. 1 can perform quantum computational tasks by executing quantum machine instructions. In some implementations, a quantum processor unit can perform quantum computation by storing and manipulating information within quantum states of a composite quantum system. For example, qubits (i.e., quantum bits) can be stored in and represented by an effective two-level sub-manifold of a quantum coherent physical system. In some instances, quantum logic can be executed in a manner that allows large-scale entanglement within the quantum system. Control signals can manipulate the quantum states of individual qubits and the joint states of multiple qubits. In some instances, information can be read out from the composite quantum system by measuring the quantum states of the qubits. In some implementations, the quantum states of the qubits are read out by measuring the transmitted or reflected signal from auxiliary quantum devices that are coupled to individual qubits.

In some implementations, a quantum processor unit (e.g., QPU 103A or QPU 103B) can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, a quantum processor unit (e.g., QPU 103A or QPU 103B) can operate using adiabatic or annealing models for quantum computing. For instance, the qubits can be initialized in an initial state, and the controlling Hamiltonian can be transformed adiabatically by adjusting control parameters to another state that can be measured to obtain an output of the quantum computation.

In some models, fault-tolerance can be achieved by applying a set of high-fidelity control and measurement operations to the qubits. For example, quantum error correcting schemes can be deployed to achieve fault-tolerant quantum computation, or other computational regimes may be used. Pairs of qubits can be addressed, for example, with two-qubit logic operations that are capable of generating entanglement, independent of other pairs of qubits. In some implementations, more than two qubits can be addressed, for example, with multi-qubit quantum logic operations capable of generating multi-qubit entanglement. In some implementations, the quantum processor unit 103A is constructed and operated according to a scalable quantum computing architecture. For example, in some cases, the architecture can be scaled to a large number of qubits to achieve large-scale general-purpose coherent quantum computing.

The example quantum processor unit 103A shown in FIG. 1 includes controllers 106A, signal hardware 104A, and a quantum processor cell 102A; similarly, the example quantum processor unit 103B shown in FIG. 1 includes controllers 106B, signal hardware 104B, and a quantum processor cell 102B. A quantum processor unit may include additional or different features, and the components of a quantum processor unit may operate as described with respect to FIG. 1 or in another manner.

In some instances, all or part of the quantum processor cell 102A functions as a quantum processor, a quantum memory, or another type of subsystem. In some examples, the quantum processor cell 102A includes a quantum circuit system. The quantum circuit system may include qubit devices, resonator devices and possibly other devices that are used to store and process quantum information. In some cases, the quantum processor cell 102A includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102A. In some cases, the quantum processor cell 102A includes an ion trap system, and the qubit devices are implemented as trapped ions controlled by optical signals delivered to the quantum processor cell 102A. In some cases, the quantum processor cell 102A includes a spin system, and the qubit devices are implemented as nuclear or electron spins controlled by microwave or radio-frequency signals delivered to the quantum processor cell 102A. The quantum processor cell 102A may be implemented based on another physical modality of quantum computing.

In some implementations, the example quantum processor cell 102A can process quantum information by applying control signals to the qubits in the quantum processor cell 102A. The control signals can be configured to encode information in the qubits, to process the information by performing quantum logic gates or other types of operations, or to extract information from the qubits. In some examples, the operations can be expressed as single-qubit logic gates, two-qubit logic gates, or other types of quantum logic gates that operate on one or more qubits. A sequence of quantum logic operations can be applied to the qubits to perform a quantum algorithm. The quantum algorithm may correspond to a computational task, a hardware test, a quantum error correction procedure, a quantum state distillation procedure, or a combination of these and other types of operations.

The example signal hardware 104A includes components that communicate with the quantum processor cell 102A. The signal hardware 104A may include, for example, waveform generators, amplifiers, digitizers, high-frequency sources, DC sources, AC sources and other type of components. The signal hardware may include additional or different features and components. In the example shown, components of the signal hardware 104A are adapted to interact with the quantum processor cell 102A. For example, the signal hardware 104A can be configured to operate in a particular frequency range, configured to generate and process signals in a particular format, or the hardware may be adapted in another manner.

In some instances, one or more components of the signal hardware 104A generate control signals, for example, based on control information from the controllers 106A. The control signals can be delivered to the quantum processor cell 102A to operate the quantum processor unit 103A. For instance, the signal hardware 104A may generate signals to implement quantum logic operations, readout operations or other types of operations. As an example, the signal hardware 104A may include arbitrary waveform generators (AWGs) that generate electromagnetic waveforms (e.g., microwave or radio-frequency) or laser systems that generate optical waveforms. The waveforms or other types of signals generated by the signal hardware 104A can be delivered to devices in the quantum processor cell 102A to operate qubit devices, readout devices, bias devices, coupler devices or other types of components in the quantum processor cell 102A.

In some instances, the signal hardware 104A receives and processes signals from the quantum processor cell 102A. The received signals can be generated by operation of the quantum processor unit 103A. For instance, the signal hardware 104A may receive signals from the devices in the quantum processor cell 102A in response to readout or other operations performed by the quantum processor cell 102A. Signals received from the quantum processor cell 102A can be mixed, digitized, filtered, or otherwise processed by the signal hardware 104A to extract information, and the information extracted can be provided to the controllers 106A or handled in another manner. In some examples, the signal hardware 104A may include a digitizer that digitizes electromagnetic waveforms (e.g., microwave or radio-frequency) or optical signals, and a digitized waveform can be delivered to the controllers 106A or to other signal hardware components. In some instances, the controllers 106A process the information from the signal hardware 104A and provide feedback to the signal hardware 104A; based on the feedback, the signal hardware 104A can in turn generate new control signals that are delivered to the quantum processor cell 102A.

In some implementations, the signal hardware 104A includes signal delivery hardware that interface with the quantum processor cell 102A. For example, the signal hardware 104A may include filters, attenuators, directional couplers, multiplexers, diplexers, bias components, signal channels, isolators, amplifiers, power dividers and other types of components. In some instances, the signal delivery hardware performs preprocessing, signal conditioning, or other operations to the control signals to be delivered to the quantum processor cell 102A. In some instances, signal delivery hardware performs preprocessing, signal conditioning or other operations on readout signals received from the quantum processor cell 102A.

The example controllers 106A communicate with the signal hardware 104A to control operation of the quantum processor unit 103A. The controllers 106A may include digital computing hardware that directly interface with components of the signal hardware 104A. The example controllers 106A may include processors, memory, clocks and other types of systems or subsystems. The processors may include one or more single- or multi-core microprocessors, digital electronic controllers, special purpose logic circuitry, e.g., an FPGA (field programmable gate array) or an ASIC (application specific integrated circuit), or other types of data processing apparatus. The memory may include any type of volatile or non-volatile memory, a digital or quantum memory, or another type of computer storage medium. The controllers 106A may include additional or different features and components.

In some implementations, the controllers 106A include memory or other components that store quantum state information, for example, based on qubit readout operations performed by the quantum processor unit 103A. For instance, the states of one or more qubits in the quantum processor cell 102A can be measured by qubit readout operations, and the measured state information can be stored in a cache or other type of memory system in or more of the controllers 106A. In some cases, the measured state information is used in the execution of a quantum algorithm, a quantum error correction procedure, a quantum processor unit (QPU) calibration or testing procedure, or another type of quantum process.

In some implementations, the controllers 106A include memory or other components that store quantum machine instructions, for example, representing a quantum program for execution by the quantum processor unit 103A. In some cases, the quantum machine instructions are received from the server 108 in a hardware-independent format. For example, quantum machine instructions may be provided in a quantum instruction language such as Quil, described in the publication "A Practical Quantum Instruction Set Architecture," arXiv:1608.03355v2, dated Feb. 17, 2017, or another quantum instruction language. For instance, the quantum machine instructions may be written in a format that can be executed by a broad range of quantum processor units or quantum virtual machines.

In some instances, the controllers 106A can interpret the quantum machine instructions and generate a hardware-specific control sequences configured to execute the operations proscribed by the quantum machine instructions. For example, the controllers 106A may generate control information that is delivered to the signal hardware 104A and converted to control signals that control the quantum processor cell 102A.

In some implementations, the controllers 106A include one or more clocks that control the timing of operations. For example, operations performed by the controllers 106A may be scheduled for execution over a series of clock cycles, and clock signals from one or more clocks can be used to control the relative timing of each operation or groups of operations. In some cases, the controllers 106A schedule control operations according to quantum machine instructions in a quantum computing program, and the control information is delivered to the signal hardware 104A according to the schedule in response to clock signals from a clock or other timing system.

In some implementations, the controllers 106A include processors or other components that execute computer program instructions (e.g., instructions formatted as software, firmware, or otherwise). For example, the controllers 106A may execute a quantum processor unit (QPU) driver software, which may include machine code compiled from any type of programming language (e.g., Python, C++, etc.) or instructions in another format. In some cases, QPU driver software receives quantum machine instructions (e.g., based on information from the server 108) and quantum state information (e.g., based on information from the signal hardware 104A), and generates control sequences for the quantum processor unit 103A based on the quantum machine instructions and quantum state information.

In some instances, the controllers 106A generate control information (e.g., a digital waveform) that is delivered to the signal hardware 104A and converted to control signals (e.g., analog waveforms) for delivery to the quantum processor cell 102A. The digital control information can be generated based on quantum machine instructions, for example, to execute quantum logic operations, readout operations, or other types of control.

In some instances, the controllers 106A extract qubit state information from qubit readout signals, for example, to identify the quantum states of qubits in the quantum processor cell 102A or for other purposes. For example, the controllers may receive the qubit readout signals (e.g., in the form of analog waveforms) from the signal hardware 104A, digitize the qubit readout signals, and extract qubit state information from the digitized signals.

The other QPU 103B and its components (e.g., the quantum processor cell 102B, the signal hardware 104B and controllers 106B) can be implemented, and in some instances operate, as described above with respect to the QPU 103A; in some cases, the QPU 103B and its components may be implemented or may operate in another manner. Similarly, the remote QPU 103C and its components can be implemented, and in some instances operate, in an analogous manner.

In some instances, the computing environment 101 can use a classical computing resource to reduce a problem to a size or format that can be more efficiently processed by a quantum computing resource. In some cases, the problem is an optimization problem. In some cases, classical pre-processing could be used to reduce the size of quantum chemistry or quantum simulation problems. As another example, classical pre-processing can be used to perform principal component analysis on data before loading the data onto a quantum resource for quantum machine learning.

In some instances, the computing environment 101 can be used to solve optimization problems such as, for example, quadratic unconstrained binary optimization (QUBO) problems. In some examples, a first computing resource computes a first part of the solution to the optimization problem, and a second computing resource computes a second part of the solution to the optimization problem. The second computing resource can find the second part of the solution, for instance, by processing a reduced form of the optimization problem. The reduced form of the optimization problem can represent a portion of the optimization problem that is not fixed by the first part of the solution. In some cases, the first computing resource is a classical (digital or non-quantum) resource (e.g., a controller in a QPU 103, or one of the other computing resources 107), and the second computing resource is a quantum resource (e.g., a quantum annealing processor, a gate-based quantum processor), a hybrid classical/quantum resource, a virtual quantum resource, etc. In some instances, the first computing resource effectively reduces the size of the optimization problem to a size that can be processed by the second computing resource. For instance, a minimum size for the first part of the solution can be specified such that the reduced form of the optimization problem is a size that can be processed by the second computing resource.

In some implementations, the computing environment 101 can implement a classical algorithm for optimization (e.g., to generate the first portion of the solution). As an example, the server 108, the other computing resources 107 or a controller in a QPU 103 may execute a classical branch-and-bound process that has been parameterized to solve a combinatorial optimization problem. An example is described with respect to FIG. 3. Other types of classical algorithms may potentially be used in some cases, including tabu solvers, mixed integer-linear programming, constraint satisfaction, and dynamic programming.

In some implementations, the computing environment 101 can implement a hybrid classical-quantum algorithm for optimization (e.g., to solve the reduced form of the optimization problem). As an example, the QPU 103A may be programmed to execute a quantum approximate optimization algorithm (QAOA) that has been parameterized to solve a combinatorial optimization problem. For instance, a combinatorial optimization problem (COP) can be encoded into an Ising Hamiltonian, in a format that is suitable for the QAOA:

$$\hat{H} = \sum_{i,j} J_{i,j}\sigma_i\sigma_j - \sum_j h_j\sigma_j$$

When executing the QAOA in a hybrid computing environment, a classical co-processor may select values for a set of parameters ($\theta$); a quantum processor may then prepare quantum states based on the selected values for the set of parameters ($\theta$) and a cost operator (the cost operator represents the problem for which an optimal solution is sought); and the quantum states may be measured to obtain a set of bit-strings (e.g., a projective measurement can be used to obtain classical bit-strings). Example techniques for implementing the QAOA are described, for instance, in U.S. Patent Pub. No. 2018/0260731. The QAOA may be implemented in another manner in some cases.

Figure 2:
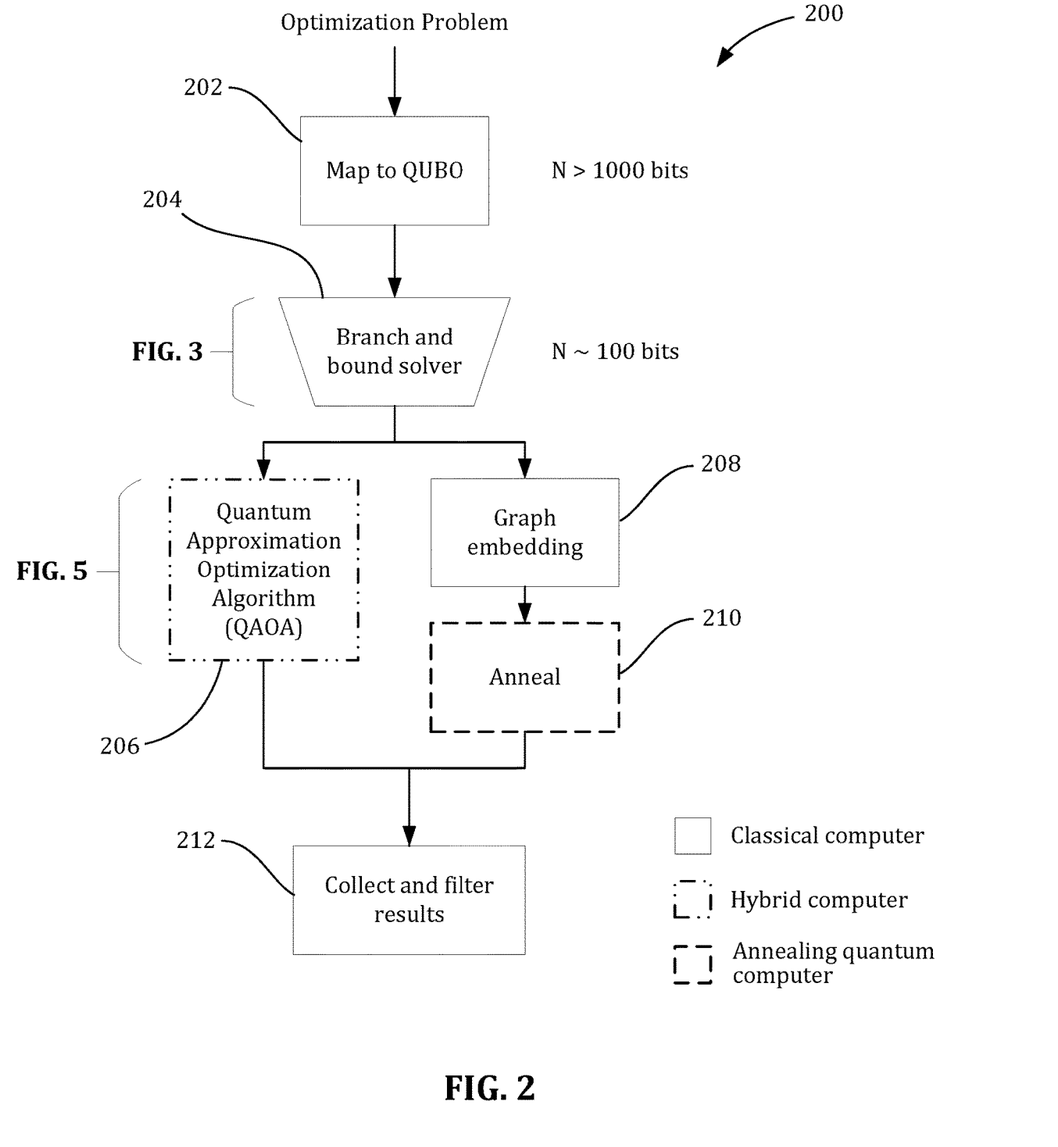
FIG. 2 is a flow chart showing an example hybrid classical-quantum computing process.

FIG. 2 is a flow chart showing an example hybrid classical-quantum computing process 200. Operations in the example process 200 may be performed, for instance, by one or more components of the example computing environment 101 shown in FIG. 1. For example, the process 200 may be performed by the QPU 103, or by the QPU 103 and the server 108, or by the QPU and one or more of the additional computing resources 107. In the example shown in FIG. 2, operations performed on a classical processor are indicated by solid lines, operations performed by hybrid classical/quantum systems are indicated by lines having dashes separated by double dots. In some implementations of the example process 200, certain operations (indicated by dashed lines in FIG. 2) may be performed by an annealing quantum processor.

At 202 in the example process 200, a classical resource is used to map a business problem of interest to a quadratic unconstrained binary optimization (QUBO) problem suitable for solving on a quantum resource. The business problem of interest may take the form of a COP, such as a staff scheduling COP, a traveling salesman COP, a knapsack problem COP, and so forth. Other optimization problems are possible. In some instances, the mapped QUBO problem may have a large size (e.g., greater than 1000 bits).

At 204 in the example process 200 a branch-and-bound QUBO solver is executed by a classical computing resource. For example, a classical processor unit may receive a first data structure that represents the optimization problem (the mapped QUBO problem). The optimization problem is structured in a way that its solution can be represented as a set of elements (e.g., a vector or another type of array). In some variations, the first data structure is an n×n matrix, and the solution to the optimization problem is the vector x that minimizes the scalar represented by $x^T A x$. In some cases, the optimization problem and its solution may have another structure, or may be represented in another format.

The branch-and-bound process can be executed at 204 to fix a number of classical bits in the solution to the optimization problem, thereby reducing a size of the optimization problem. The size may be reduced to a significantly smaller size. For instance, a 1000 bit optimization problem may be mapped to a reduced optimization problem of less than 200 bits, or in some instances, less than 100 bits. In reducing the optimization problem, the classical resource may determine a bit-string that represents a portion of the solution to the mapped QUBO problem. An example branch-and-bound QUBO solver and its operation are described further in relation to FIG. 3.

The branch-and-bound process can be executed on the first data structure to generate values for a first subset of elements of the solution to the larger optimization problem. The first subset of elements may correspond to the bit-string determined by the classical resource when fixing certain classical bits in the solution. The first subset of elements can be, for example, a portion of elements in the vector x that represents the solution to the optimization problem. In some cases, a second data structure is generated from the first data structure and the first subset of elements. The second data structure represents the reduced version of the optimization problem. For instance, if the first data structure represents the optimization problem as an n×n matrix, the second data structure may represent the reduced optimization problem as an n'×n' matrix, where n'<n.

The branch-and-bound process may be run for a predetermined duration of time (e.g., a certain number of hours, minutes, seconds, etc.), until a predetermined reduced problem size is reached (e.g., a 200 bit reduced problem size, a 100 bit reduced problem size, etc.) or until another termination criterion is reached. Accordingly, the execution of the branch-and-bound process may be stopped after a specified amount of time; or the execution of the branch-and-bound process may be stopped when the number of elements in the first subset is equal to or greater than a threshold that is based on a number of qubits in a quantum processor unit. In some cases, the threshold can be based on the number of qubits in a quantum processor unit that will be used to solve a reduced version of the optimization problem. For instance, the branch-and-bound process may be stopped when the number of undetermined solution elements is less than or equal to the number of qubits that will be used in the quantum processor unit. Another threshold value may be used.

In some implementations, the termination condition for the branch-and-bound process performed at 204 may depend on the specific problem and the choice of quantum resource targeted. For implementations where the quantum resource includes an annealing quantum computer, the graph embedding process 208 is an additional pre-processing step for the classical resource before the annealing step 210. This graph embedding process requires mapping QUBO problem variables to physical qubits in the annealing quantum computer in a way which respects pairwise variable interactions, with some or all individual problem variables mapping to several physical qubits. In this context, the size of the embedded graph is generally larger than the number of problem variables, and hence the branch-and-bound termination condition must take this into account. For implementations where the quantum resource includes a gate-based quantum computer, each problem variable may translate to a single physical qubit in a connected lattice, and the QAOA program may be executed on the quantum resource after undergoing a compilation process (for example, one which introduces SWAP operations, and translates to native gates). In this context, it is possible to terminate the classical branch-and-bound process once the number of unassigned problem variables does not exceed the number of physical qubits (or logical qubits, in some cases). In some instances, it may be preferable to use alternative stopping conditions which incorporate information about the compilation process (for example, one may stop when the compiled program length does not exceed a certain threshold, for purposes of reducing the effects of noise when executing on the quantum computer).

In the example process 200, the reduced QUBO problem may be solved by either or both of two techniques, as indicated by block 206 or blocks 208, 210. As shown at 206, a hybrid classical/quantum resource can execute a quantum approximate optimization algorithm (QAOA) to solve the reduced optimization problem in some cases. The hybrid classical/quantum computing system may include a classical resource that assists the quantum resource in executing the QAOA to solve the reduced optimization problem. The quantum resource may include, for example, a gate-based quantum computer or an annealing quantum computer. Further details of executing the QAOA are described in relation to FIG. 5. In some cases, a quantum processor unit (in coordination with one or more classical processor units) executes the QAOA on the second data structure (which represents the reduced optimization problem) to generate values for a second subset of elements of the solution to the optimization process. For instance, values for all remaining elements of the solution (i.e., elements not in the first subset) may be determined by the QAOA process. Example techniques for executing the QAOA on a gate-based quantum computer are described in U.S. Publication No. 2018/0260731, which is hereby incorporated by reference.

In some implementations, the reduced QUBO problem can be represented as a graph where a connection between bit i and bit j indicates the corresponding $J_{i,j} \neq 0$. For example, and as shown in FIG. 2, the example process 200 may include using the classical resource to map logical bits to physical (or device) qubits to produce a graph representation of the reduced QUBO problem. The graph representation may allow the reduced QUBO problem to be compatible with the quantum resource's physical connectivity (where a connection between qubit i and qubit j may indicate that the two qubits can be entangled). Mapping by the classical resource may include a graph embedding process, as indicated by block 208. For implementations where the quantum resource includes an annealing quantum computer, the graph embedding process 208 is an additional pre-processing step for the classical resource before the annealing step 210.

At 212 in the example process 200, data are collected from the appropriate computing resources. For instance, bit-strings may be sampled from the quantum resource and filtered on the classical resource by computing the quality of each solution. Such bit-strings may correspond to the second subset of elements generated from the second data structure. Accordingly, values for the first subset of elements and the second subset of elements may represent a complete solution to the optimization problem. In some implementations, the sampled and filtered bit-strings are combined with the bit-string from the branch-and-bound QUBO solver to generate the solution to the mapped QUBO problem. For example, the first subset of elements and the second subset of elements may be combined to obtain the solution to the optimization problem. In many instances, such combination occurs by operation of the classical processor unit.

In the example process 200 shown in FIG. 2, some of the operations are performed by classical computing resources (e.g., a digital microprocessor) and others are performed by quantum computing resources (e.g., a quantum processor). For example, in some implementations, operation 206 is performed by a quantum processor unit operating in combination with a classical processor unit, and other operations are performed by the classical processor unit. For example, in the example computing environment 101 shown in FIG. 1, executing operation 206 in FIG. 2 may include storing and processing information in the quantum processor cell 102 and the server 108 (or controllers 106), while other operations in FIG. 2 may be executed by the classical processor unit (e.g., in the controllers 106, the server 108 or the additional computing resources 107). In some cases, the process 200 can be executed by other types of hardware.

The example process 200 may include additional or different operations, and the operations may be performed in the order shown or in another order. In some cases, one or more of the operations shown in FIG. 2 are implemented as processes that include multiple operations, sub-processes or other types of routines. In some cases, operations can be combined, performed in another order, performed in parallel, iterated, or otherwise repeated or performed in another manner.

In some cases, the example process 200 can be applied to a variety of combinatorial optimization problems (COPs), for example, those that are reducible to Maximum Cut, including any of the twenty-one example COPs, known as "Karp's 21 problems," which are described in the publication entitled "Reducibility among Combinatorial Problems" (by Richard M. Karp, in Complexity of Computer Computations, edited by R. E. Miller and J. W. Thatcher (New York: Plenum, 1972) pp. 85-103): (1) the satisfiability problem, (2) the 0-1 integer programming problem, (3) the clique problem, (4) the set packing problem, (5) the node cover problem, (6) the set covering problem, (7) the feedback node set problem, (8) the feedback arc set problem, (9) the directed Hamilton circuit problem, (10) the undirected Hamilton circuit problem, (11) the satisfiability with at most 3 literals per clause problem, (12) the chromatic number problem, (13) the clique cover problem, (14) the exact cover problem, (15) the hitting set problem, (16) the Steiner tree problem, (17) the three-dimensional matching problem, (18) the knapsack problem, (19) the job sequencing problem, (20) the partition problem, and (21) the Maximum Cut problem. (COP) or another type of optimization problem.

Figure 3:
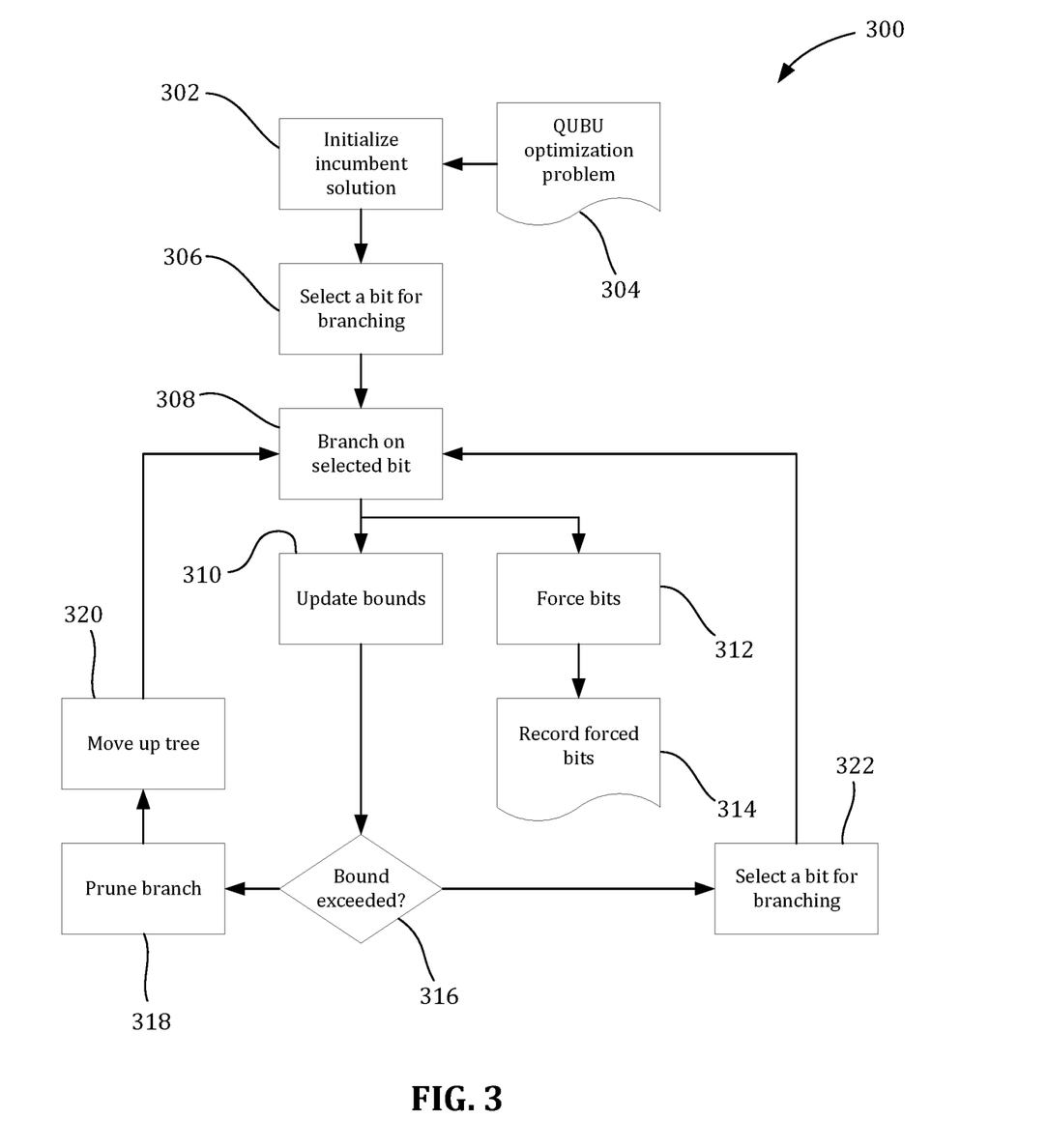
FIG. 3 is a flow chart showing an example branch-and-bound process.

Now referring to FIG. 3, a flow chart is presented of an example branch-and-bound process 300, which can be executed on a classical computing resource (e.g., on a classical processor unit, etc.). The example branch-and-bound process 300 may be analogous to the branch-and-bound QUBO solver described in relation to FIG. 2. At 302, a candidate or incumbent solution to a QUBO optimization problem is initialized in the form of a length N array of bits. This candidate solution can be, for example, an all zero bit-string (e.g., 000 . . . 0) or the result of a heuristic solver. The initialization process may include receiving a data structure representing the QUBO optimization problem 304.

At 306, a bit (e.g., an arbitrary bit in the solution array) is selected to serve as a root of a branch-and-bound tree. The selected bit can represent a first or starting position of the tree. At 308, the selected bit is then "branched" by initializing two sub-calculations. A first sub-calculation fixes the selected bit to a first value ("0"), and a second sub-calculation fixes the selected bit to another value ("1"). The first and second sub-calculations are stored on a stack and performed sequentially. At 310, bounds for a globally optimal solution score are updated based on the fixed bits of the current sub-calculation (or branch).

At 312, bits in the solution are forced. For example, first-derivative lower and upper bounds can be computed according to the formulas $lb_i = \Sigma_j q_{ij}^- + q_{ii}$ and $ub_i = \Sigma_{ij}^+ + qi_i + q_{ij}^+$ and $q_{ij}^-$ where q and denote, respectively, positive and negative elements of a problem matrix. The first-derivative lower and upper bounds can be used to force a maximum number of bits in the solution as possible. However, other numbers of bits below the maximum number of bits may be forced based on the first-derivative bounds in some cases. At 314, the forced bits are recorded. In the example shown, the forced bits are values for a first subset of elements of the solution to the optimization problem, which can be used to create a reduced optimization problem for a quantum approximate optimization algorithm (QAOA).

At 316, the updated bounds computed at 310 are compared to a current best value. If the bound is exceeded, the example branch-and-bound process 300 continues to 318, where the branch is pruned and no new sub-calculations are queued based on this branch. The process 300 then moves up the tree at 320, and then returns to 308, where another sub-calculation from the stack is executed. If the bound is not exceeded at 316, the example branch-and-bound process 300 continues to 322, where another bit is selected (a bit that has not been previously branched on). The process 300 then returns to 308 where the new selected bit is "branched" by initializing two sub-calculations.

Figure 4A:
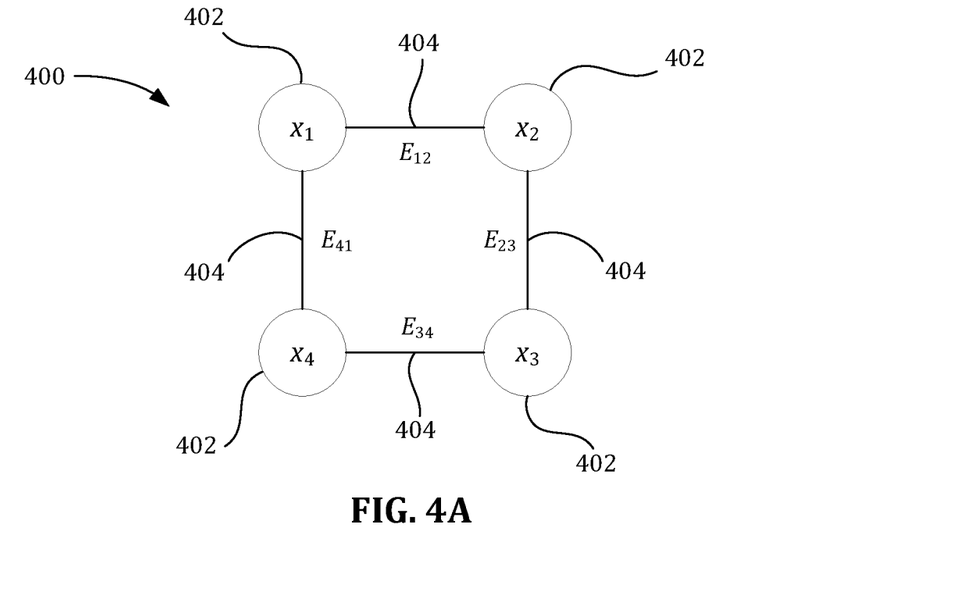
FIG. 4A is a schematic diagram of an example four-node ring for an example Max Cut problem.
Figure 4B:
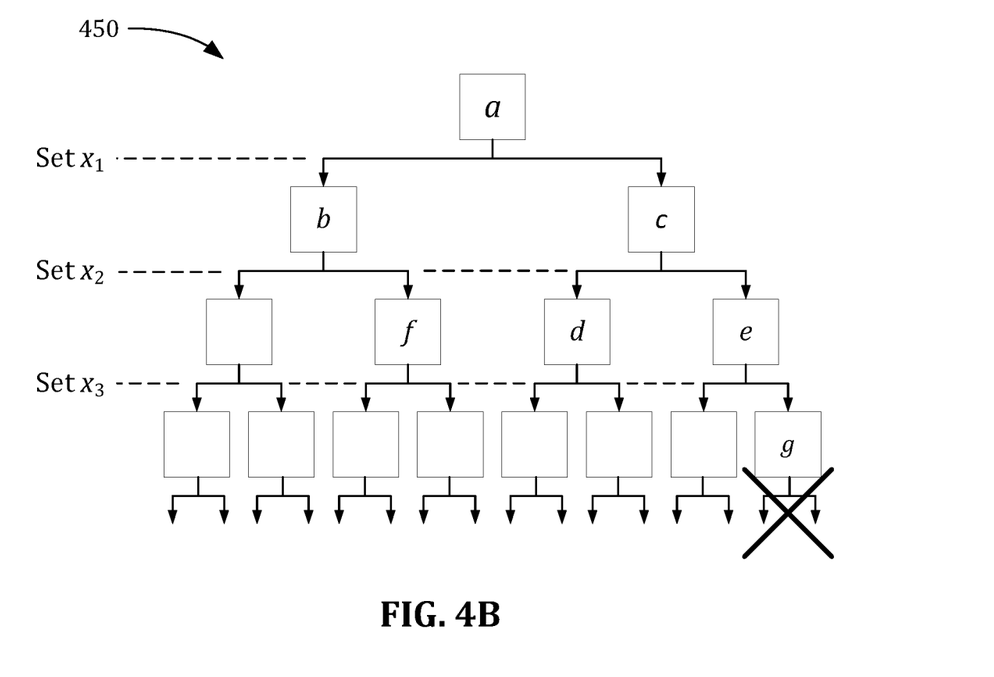
FIG. 4B is a schematic diagram of an example branch-and-bound tree associated with the example four-node ring of FIG. 4A.

FIGS. 4A and 4B show aspects of an example branch-and-bound process for an example "MaxCut" problem. FIG. 4A presents a schematic diagram of an example four-node ring 400 representing an example "MaxCut" problem. The four-node ring includes four nodes 402 connected by four edges 404 in a ring topology. Although FIG. 4A presents the "MaxCut" problem in the context of a ring of nodes, the "MaxCut" problem may have other topologies and other quantities of nodes and edges In the example shown in FIG. 4A, each node 402 is assigned one element, e.g., $x_1$, $x_2$, $x_3$, and $x_4$, of a larger-element solution, e.g. ($x_1$, $x_2$, $x_3$, $x_4$, . . . ). The elements may be set to an element value of either 0 or 1, and as such, the elements may define a bit string. The edges 404 may take an edge value, e.g., $E_{12}$, $E_{23}$, $E_{34}$, and $E_{41}$, that reflects whether nodes at the ends of each respective edge 404 "agree" or "disagree". The edge value is −1 if the two respective element values are different and +1 if the two respective element values are the same. For example, if $x_1$=1 and $x_2$=1 then $E_{12}$=+1; if $x_1$=0 and $x_2$=0 then $E_{12}$=+1; if $x_1$=1 and $x_2$=0 then $E_{12}$=−1; and if $x_1$=0 and $x_2$=1 then $E_{12}$=−1. An edge reflects agreement if a corresponding edge value is +1 and disagreement if the corresponding edge value is −1.

FIG. 4B presents a schematic diagram of an example branch-and-bound tree 450 associated with the example four-node ring 400 of FIG. 4A. The example branch-and-bound tree 450 starts at a root, which then branches out through multiple levels. Each branch level corresponds to an element of the larger-element solution being set or forced. In FIG. 4B, the example branch-and-bound tree 450 is depicted as having three levels corresponding to the progressive setting or forcing of elements $x_1$, $x_2$, and $x_3$. In some implementations, the tree 450 may have a different number and sequence of forced elements. Moreover, the elements may include other elements from the larger-element solution (e.g., other than $x_1$, $x_2$, $x_3$, and $x_4$).

In the example branch-and-bound tree 450, each branch progressively expands a number of states in the tree 450 that are evaluated to solve the optimization problem. As such, if one or more branches can be pruned, the computational resources required to solve the optimization problem can be reduced. In the "MaxCut" problem, pruning may be achieved by maximizing a number of nodes that disagree with their neighbor, i.e., maximizing a number of edges that have edge values of −1. Such maximization may also include evaluating upper and lower bounds associated with a state in the example branch-and-bound tree 450. In FIG. 4B, each level includes states (represented by boxes) that correspond to one or more forced elements. States a-g are shown in FIG. 4B and described below in TABLE 1:

TABLE 1

| State | Forced Element Value | | | | Upper Bound | Lower Bound | z | Current Best |
|---|---|---|---|---|---|---|---|---|
| | $X_1$ | $X_2$ | $X_3$ | $X_4$ | | | | |
| a | — | — | — | — | 4 | −4 | 4 | 4 |
| b | 1 | — | — | — | 4 | −4 | 0 | 0 |
| c | 0 | — | — | — | 4 | −4 | 4 | 0 |
| d | 0 | 1 | — | — | 2 | −4 | 0 | 0 |
| e | 0 | 0 | — | — | 4 | −2 | 4 | 0 |
| f | 1 | 0 | — | — | 2 | −4 | 0 | 0 |
| g | 0 | 0 | 0 | — | 4 | 0 | 4 | 0 |

State a, which represents the root of tree 450, corresponds to an incumbent solution where $(x_1, x_2, x_3, x_4)=(0, 0, 0, 0)$ and no elements have forced values. The edges contribute to an objective function, z, which is a sum of the edge values. For state a, all nodes have element values of 0, so the corresponding edge values are +1. The objective function z thus equals 4 (i.e., $z=E_{12}+E_{23}+E_{34}+E_{41}=1+1+1+1=4$) and the edges 404 reflect agreement between all pairs of neighboring nodes 402.

In TABLE 1, the value for current best corresponds to the lowest value of z in all states up to and including a just-evaluated state. The value seeks to maximize the number of nodes that disagree with their neighbors (or maximizes the number of edges that have edge values of −1), and as such, is re-determined as each state in the tree 450 is progressively evaluated. At state a, no prior value of current best exists, so the present value of z is assigned to be the value for current best.

The upper and lower bounds for state a reflect the maximum and minimum values possible for z as elements $x_1$, $x_2$, $x_3$, and $x_4$ are forced to 0 or 1. Such forcing occurs as the example branch-and-bound tree 450 progresses away from the root. For state a, the elements $x_1$, $x_2$, $x_3$, and $x_4$ may be all forced to 1 or 0 at some state downstream from the root, e.g., (1, 1, 1, 1) or (0, 0, 0, 0). As such, the upper bound for state a is 4. Similarly, the elements $x_1$, $x_2$, $x_3$, and $x_4$ may be forced to (1, 0, 1, 0) or (0, 1, 0, 1) at some two states downstream from the root. The lower bound for state a is thus −4.

In FIG. 4B, proceeding from state a to either of state b or c includes forcing $x_1$ to 1 or 0, respectively. In state b, forcing $x_1$ to 1 implies $(x_1, x_2, x_3, x_4)=(1, 0, 0, 0)$. As such, $E_{12}=-1$, $E_{23}=+1$, $E_{34}=+1$, $E_{41}=-1$, and z=0. This new value of z is lower than the previous value for current best, and as such, the value for current best is updated from 4 to 0. The upper and lower bounds for state b are, respectively, 4 and −4. For example, with $x_1$ fixed at 1, further branching away from state b includes the states corresponding to (1, 1, 1, 1), where z=4, and (1, 0, 1, 0), where z=−4. In state c, analogous considerations result in the upper bound, the lower bound, and the objective function z being 4, −4, and 4, respectively. The value of z is not lower than the previous value for current best, so the value for current best is not updated.

For states d, e, f, g, the upper bounds, the lower bounds, and the objective function z can be determined in a manner similar to that described for states a, b, c. However, for state g, the lower bound is equal to the current best. For the "MaxCut" problem, if a lower bound is greater than or equal to the value for current best, the corresponding branch can be pruned. In FIG. 4B, the branch corresponding to state g is depicted as crossed-out, as shown by an "X". This branch is pruned from the example branch-and-bound tree 450, thereby reducing the computational resources required to solve the optimization problem. States downstream of state g will not lower the value for current best and can thus be ignored. Although FIG. 4B, depicts only state g as being pruned, other states in the tree 450 may be suitable for pruning. Moreover, in other "MaxCut" problems, branches may be pruned in different positions and numbers than those shown by FIGS. 4A & 4B.

The example branch-and-bound process 400 can save computational effort relative to "brute-force" enumeration by pruning branches. The performance of a branch-and-bound process may be influenced by how often branches can be pruned. Finding good approximate solutions earlier may allow more branches to be pruned, and developing tighter bounds may allow more branches to be pruned.

Figure 5:
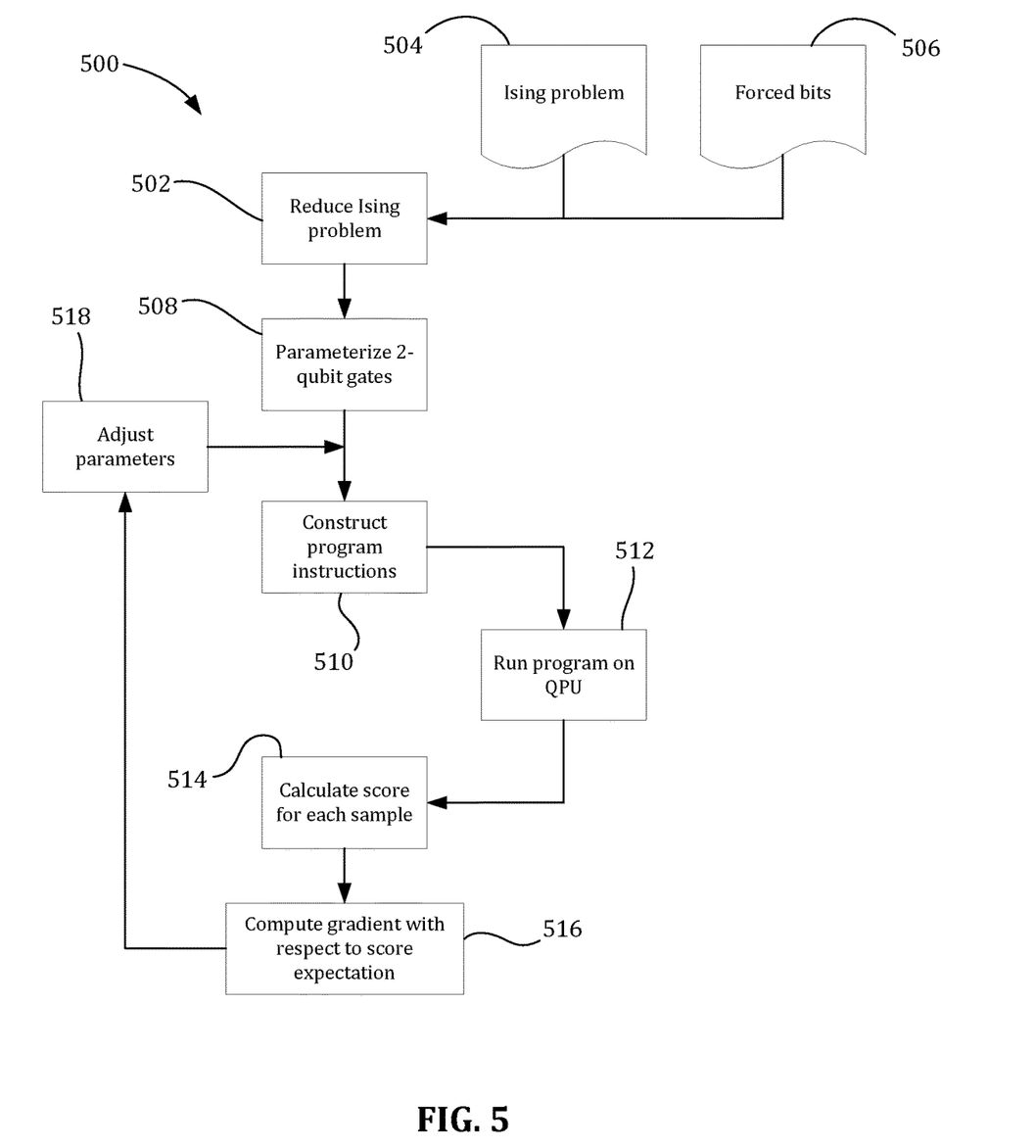
FIG. 5 is a flow chart showing an example quantum approximate optimization algorithm (QAOA) process.

Now referring to FIG. 5, a flow chart is presented of an example process 500 that includes execution of a quantum approximate optimization algorithm (QAOA). The QAOA and other operations in the process 500 may be executed, for example, by a hybrid computing system. The QAOA in the process 500 is executed on a reduced version of an optimization problem, such as the reduced version of the mapped QUBO problem in FIG. 2.

At 502, the size of an optimization problem (an Ising problem in the example shown) is reduced by removing rows and columns of a problem matrix that correspond to bits that have been forced during a branch-and-bound process. In some cases, a computational resource receives one or more data structures that represents the Ising problem 504 and the forced bits 506, and generates another data structure that represents a reduced version of the Ising problem 504.

At 508, two qubit gates of the QAOA prescription are parameterized according to the reduced Ising problem coefficients. At 510, a list of quantum program instructions is constructed according to the parameterization. At 512, the quantum program instructions are executed on a quantum processor unit (or quantum simulator). At 514, the results of the quantum calculation are analyzed by computing a score of each sampled bit-string for the reduced Ising problem. At 516, a gradient of the score is estimated to update the program parameters. At 518, the program parameters are adjusted, and operations 510, 512, 514, 516 are then iterated. The process 500 may continue, for example, until a sufficiently high-quality solution has been obtained, until the parameters have reached optimal values, or until another terminating condition has been reached. In some cases, the forced bits 506 can be combined with the best (reduced) bit-string samples from the quantum processor unit and reported as a complete solution.

In some cases, when the process 500 utilizes a gate-based quantum computer, the QAOA algorithm specifies a quantum program to be executed, involving some indeterminate gate parameters. The execution, shown in FIG. 5, involves a feedback loop in which programs are constructed with some existing parameter values (at 510), programs are executed (at 512), programs are scored (at 514), and a parameter update is performed (at 516 and 518). The overall performance of this procedure depends on both the initial choice of parameter values as well as the specific choice of update mechanism. The initial choice of parameter values may be made at random, may be made as discrete approximants to a continuous-time annealing schedule, or may be selected based on an analysis of the QUBO problem at hand, among other options. The update step (at 518) may correspond to the step of a classical optimization routine such as the Nelder-Mead algorithm, gradient descent, stochastic gradient descent, the Broyden-Fletcher-Goldfarb-Shanno (BFGS) algorithm, or others.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data-processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both. Elements of a computer can include a processor that performs actions in accordance with instructions, and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media and memory devices, including by way of example semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A method of operating a hybrid computer system, the hybrid computer system comprising a quantum processor unit and one or more classical processor units, the quantum processor unit comprising:
    a quantum processor cell configured to process quantum information by applying control signals to qubits in the quantum processor cell, wherein the quantum processor cell comprises a superconducting circuit comprising qubit devices that define the qubits,
    a controller configured to generate control information, and
    signal hardware configured to:
        generate the control signals based on the control information, and
        deliver the control signals to the quantum processor cell,
    the method comprising:
    by operation of at least one of the one or more classical processor units:
        identifying a number of qubits defined by the qubit devices in the superconducting circuit in the quantum processor unit;
        receiving a first data structure that represents an optimization problem;
        executing a branch-and-bound process that is operable to generate a solution to the optimization problem, wherein the branch-and-bound process is executed on the first data structure to generate values for a first subset of elements of the solution to the optimization problem;
        stopping the execution of the branch-and-bound process when a number of elements in the first subset of elements is equal to or greater than a threshold that is based on the number of qubits defined by the qubit devices in the superconducting circuit in the quantum processor unit;
        generating a second data structure based on the first data structure and the first subset of elements, the second data structure representing a reduced version of the optimization problem;
    executing, by operation of the quantum processor unit and at least one of the one or more classical processor units, a quantum approximate optimization algorithm (QAOA) on the second data structure to generate values for a second subset of elements of the solution to the optimization problem, wherein executing the QAOA comprises an iterative process, and each iteration of the iterative process comprises:
        by operation of the at least one of the one or more classical processor units:
            adjusting parameters of the QAOA, and
            constructing quantum program instructions according to the adjusted parameters;
        by operation of the controller, generating a hardware-specific control sequence configured to execute the operations proscribed by the quantum program instructions; and
        by operation of the controller, the signal hardware and the quantum processor cell, executing the hardware-specific control sequence; and
    combining, by operation of at least one of the one or more classical processor units, the values of the first and second subsets of elements to obtain the solution to the optimization problem.

2. The method of claim 1, comprising mapping the reduced version of the optimization problem to connectivity of the qubit devices in the quantum processor unit.

3. The method of claim 2, wherein the mapping comprises translating problem variables to the qubit devices in a connected lattice in the quantum processor unit.

4. The method of claim 1,
    wherein the first data structure comprises an n×n matrix (A) and the first and second subsets of elements comprises a vector (x) of length n; and
    wherein the solution to the optimization problem minimizes a scalar represented by $x^T A x$.

5. The method of claim 1, wherein the optimization problem is a combinatorial optimization problem (COP).

6. The method of claim 1, wherein the QAOA is executed by the quantum processor unit and at least one of the one or more classical processor units.

7. A hybrid computer system comprising a quantum processor unit (QPU) and one or more classical processor units, the quantum processor unit comprising:
    a quantum processor cell configured to process quantum information by applying control signals to qubits in the quantum processor cell, wherein the quantum processor cell comprises a superconducting circuit comprising qubit devices that define the qubits,
    a controller configured to generate control information, and
    signal hardware configured to:
        generate the control signals based on the control information, and
        deliver the control signals to the quantum processor cell,
    at least one of the one or more classical processor units configured to perform operations comprising:
        identifying a number of qubits defined by the qubit devices in the superconducting circuit in the quantum processor unit;
        receiving a first data structure that represents an optimization problem;

executing a branch-and-bound process that is operable to generate a solution to the optimization problem, wherein the branch-and-bound process is executed on the first data structure to generate values for a first subset of elements of the solution to the optimization problem;

stopping the execution of the branch-and-bound process when a number of elements in the first subset of elements is equal to or greater than a threshold that is based on the number of qubits defined by the qubit devices in the superconducting circuit in the quantum processor unit;

generating a second data structure based on the first data structure and the first subset of elements, the second data structure representing a reduced version of the optimization problem; and combining the values of the first subset of elements and values of a second subset of elements to obtain the solution to the optimization problem;

the quantum processor unit and at least one of the one or more classical processor units configured to execute a quantum approximate optimization algorithm (QAOA) based on the second data structure to generate the values for the second subset of elements of the solution to the optimization problem, wherein executing the QAOA comprises an iterative process, and each iteration of the iterative process comprises:

by operation of the at least one of the one or more classical processor units:
adjusting parameters of the QAOA, and
constructing quantum program instructions according to the adjusted parameters:

by operation of the controller, generating a hardware-specific control sequence configured to execute the operations proscribed by the quantum program instructions; and by operation of the controller, the signal hardware and the quantum processor cell, executing the hardware-specific control sequence.

8. The hybrid computer system of claim 7, the operations comprising mapping the reduced version of the optimization problem to connectivity of the qubit devices in the quantum processor unit.

9. The hybrid computer system of claim 8, wherein the mapping comprises translating problem variables to the qubit devices in a connected lattice in the quantum processor unit.

10. The hybrid computer system of claim 7,
wherein the first data structure comprises an n×n matrix (A) and the first and second subsets of elements comprises a vector (x) of length n; and
wherein the solution to the optimization problem minimizes a scalar represented by $x^T A x$.

11. The hybrid computer system of claim 7, wherein the optimization problem is a combinatorial optimization problem (COP).

12. The hybrid computer system of claim 7, wherein the QAOA is executed by the quantum processor unit and at least one of the one or more classical processor units.

* * * * *

UNITED STATES PATENT AND TRADEMARK OFFICE
CERTIFICATE OF CORRECTION

PATENT NO. : 11,574,030 B1
APPLICATION NO. : 16/663848
DATED : February 7, 2023
INVENTOR(S) : Harrigan et al.

Page 1 of 1

It is certified that error appears in the above-identified patent and that said Letters Patent is hereby corrected as shown below:

In the Specification

Column 1, Line 49, delete "S ⊂ 2˙|E|" and insert -- S ⊂ 2^|E| -- therefor.

Column 14, Lines 9-10, delete "lb$_i$=Σ$_j$q$_{ij}$⁻+q$_{ii}$ and ub$_i$=Σ$_{ij}$⁺+qi$_i$+q$_{ij}$⁺ and q$_{ij}$⁻" and insert
-- $lb_i = \sum_j q_{ij}^- + q_{ii}$ and $ub_i = \sum_j q_{ij}^+ + q_{ii}$, -- therefor.

Column 14, Line 10, delete "q and" and insert -- $q_{ij}^+$ and $q_{ij}^-$ -- therefor.

Column 14, Line 42, after "edges", insert -- . --.

Column 14, Line 52, delete "x$_i$=1" and insert -- $x_1 = 1$ -- therefor.

Column 14, Line 54, delete "x$_i$=0" and insert -- $x_1 = 0$ -- therefor.

In the Claims

Column 22, Claim 7, Line 2, delete "parameters:" and insert -- parameters; -- therefor.

Signed and Sealed this
Twenty-third Day of May, 2023

Katherine Kelly Vidal
*Director of the United States Patent and Trademark Office*